US010541506B1

(12) United States Patent
Rajendra et al.

(10) Patent No.: US 10,541,506 B1
(45) Date of Patent: Jan. 21, 2020

(54) CONJUGATED POLYMER LASER WITH TEMPERATURE-CONTROLLED POWER OUTPUT

(71) Applicant: KING SAUD UNIVERSITY, Riyadh (SA)

(72) Inventors: Saradh Prasad Rajendra, Riyadh (SA); Mohamad Saleh Alsalhi, Riyadh (SA); Mamduh Jamil Aljaafreh, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/380,945

(22) Filed: Apr. 10, 2019

(51) Int. Cl.
*H01S 3/213* (2006.01)
*H01S 3/102* (2006.01)
(Continued)

(52) U.S. Cl.
CPC .......... *H01S 3/213* (2013.01); *C09B 69/103* (2013.01); *H01S 3/022* (2013.01); *H01S 3/0402* (2013.01); *H01S 3/0405* (2013.01); *H01S 3/08059* (2013.01); *H01S 3/094034* (2013.01); *H01S 3/1028* (2013.01)

(58) Field of Classification Search
CPC .. H01S 3/213; H01S 3/1028; H01S 3/094034; H01S 3/08059; H01S 3/022; H01S 3/0402; H01S 3/0405; C09B 69/103
See application file for complete search history.

(56) References Cited

U.S. PATENT DOCUMENTS 7,799,875 B2    9/2010  Buesing et al.
8,315,288 B2   11/2012  Yukawa et al.
(Continued)

OTHER PUBLICATIONS

Mcgehee et al. "Semiconducting (conjugated) polymers as materials for solid-state lasers." Advanced Materials 12.22 (2000): 1655-1668.

(Continued)

*Primary Examiner* — Xinning(Tom) Niu
(74) *Attorney, Agent, or Firm* — Richard C. Litman; Nath, Goldberg & Meyer

(57) ABSTRACT

The conjugated polymer laser with temperature-controlled power output uses a triphenylamine dimer-based conjugated polymer as the laser medium to produce an output laser beam having a beam energy tunable between approximately 20 μJ and approximately 325 μJ over a temperature range of the triphenylamine dimer-based conjugated polymer between approximately 40° C. and approximately 85° C. The triphenylamine dimer-based conjugated polymer laser medium is a solution of poly[N,N'-bis(4-butylphenyl)-N,N'-bisphenylbenzidine], known as poly-TPD(4B), dissolved in toluene. Poly-TPD(4B) has a long side chain of butyl ($C_4H_9$), providing temperature-dependent dimerization, which may not be found with shorter chains of butyl, such as in poly-TPD(4E) or poly-TPD(4M). The molar concentration of the poly-TPD in the solution is between approximately 5 μM and approximately 100 μM. Additional adjustable tuning of the molar concentration of the poly-TPD in the solution provides for wavelength tuning of the output laser beam between approximately 415 nm and approximately 445 nm.

19 Claims, 7 Drawing Sheets

(51) Int. Cl.
*H01S 3/094* (2006.01)
*C09B 69/10* (2006.01)
*H01S 3/02* (2006.01)
*H01S 3/04* (2006.01)
*H01S 3/08* (2006.01)

(56) References Cited

U.S. PATENT DOCUMENTS

| | | | |
|---|---|---|---|
| 8,494,021 B2 | 7/2013 | Yukawa et al. | |
| 9,698,561 B1 * | 7/2017 | Rajendra | H01S 3/213 |
| 2002/0185635 A1 * | 12/2002 | Doi | C08G 61/02 |
| | | | 252/582 |

OTHER PUBLICATIONS

Hoerhold et al. "Synthesis of TPD-containing polymers for use as light-emitting materials in electroluminescent and laser devices." Organic Light-Emitting Materials and Devices IV. vol. 4105. International Society for Optics and Photonics, 2001.

Pisignano et al. "Amplified spontaneous emission and efficient tunable laser emission from a substituted thiophene-based oligomer." Applied Physics Letters 81.19 (2002): 3534-3536.

Scherf et al. "Conjugated polymers: lasing and stimulated emission." Current Opinion in Solid State and Materials Science 5.2-3 (2001): 143-154.

Prasad et al. "Design of a Tunable Broadband Conjugated-Polymer Laser in Solution." International Journal of Engineering and Technology 6.4 (2014): 255.

* cited by examiner

CONJUGATED POLYMER LASER WITH TEMPERATURE-CONTROLLED POWER OUTPUT

BACKGROUND

1. Field

The disclosure of the present patent application relates to lasers, and particularly to a conjugated polymer laser with temperature-controlled power output.

2. Description of the Related Art

There is a great deal of interest in optically pumped tunable lasers, since such lasers have a very broad range of application, from industrial purposes to medical applications. However, optically pumped, tunable solid-state lasers, such as Ti:sapphire and forsterite lasers, although presently commercially available, are both expensive and have limited tunability. Presently, research is being directed towards dye lasers, which use such dyes as rhodamine and coumarin derivatives as a lasing medium, since such dye-based laser media have an excellent capacity for tunability. However, such dyes have, thus far, been found to have shortcomings related to their photochemical stability.

In order to find an alternative to such dyes as rhodamine and coumarin derivatives, conjugated polymers have been proposed as a potential new type of laser material, since conjugated polymers should exhibit better photochemical stability than conventional dye solutions. Conjugated polymers contain alternating C═C double bonds (typically one σ-bond and one π-bond) and C—C single bonds (σ-bonds). This alternation of single and double bonds determines the opening of the band gap due to the Peierls distortion and explains why conjugated polymers in their neutral state are semiconductors and not metals. As a result of the oscillation of the π-electrons, electromagnetic radiation is absorbed. The process is similar to what occurs during the photosynthesis process in plants. For example, a molecule with only one conjugated double bond will absorb only ultraviolet light. With additional conjugated double bonds, a molecule will be able to absorb different wavelengths of visible light. The π-electrons are responsible for determining the electrical and chemical properties.

Laser action (including wave-guided traveling wave laser action) has been achieved using various poly-phenylenevinylenes (PPVs), poly-phenylene-ethynylenes (PPEs), ladder-type poly-para-phenylenes (PPP), polyfluorenes (PFs), poly-phenylacethylenes (PPAs), poly-arylene-vinylenes (PAVs), poly-thiophenes (PTs), triphenylamine (TPA)-based conjugated polymers, and triphenylamine dimer (TPD)-based conjugated and non-conjugated polymers. TPD-based conjugated polymers are of particular interest, as they have been found to exhibit hole conductivity; i.e., they are classified as hole conducting polymers. Thus, TPD-based conjugated polymers show promise for laser applications, since for hole conducting polymers, the process of electron blocking and hole conduction takes place more effectively, thus improving the overall efficiency of the laser.

Poly[N,N'-bis(4-butylphenyl)-N,N'-bisphenylbenzidine] (also referred to as "poly(4-butylphenyldiphenylamine)" or "poly-TPD(4B)") is a desirable TPD-based conjugated polymer laser material. However, with this polymer, the relationship between temperature and dimerization is inversely proportional. Thus, at low temperatures, poly-TPD tends to form dimers, increasing the reabsorption and scattering process, making it unusable as a lasing medium. However, at higher temperatures, the poly-TPD dissociates into individual polymer chains and unfolds. This action increases the absorption co-efficiency, transparence, optical gain co-efficiency, and optical gain cross-sections. Thus, in order to effectively use poly-TPD(4B) as a lasing medium, it is necessary to control its temperature during the lasing process. Thus, a conjugated polymer laser with temperature-controlled power output solving the aforementioned problems is desired.

SUMMARY

The conjugated polymer laser with temperature-controlled power output uses a triphenylamine dimer (TPD)-based conjugated polymer as the laser medium to produce an output laser beam having a beam energy tunable between approximately 20 µJ and approximately 325 µJ over a temperature range of the conjugated polymer between approximately 40° C. and approximately 85° C. The poly-TPD conjugated polymer laser medium is a solution of poly[N,N'-bis(4-butylphenyl)-N,N'-bisphenylbenzidine], known as poly-TPD(4B); dissolved in a solvent, such as toluene. However, it should be understood that any other suitable type of solvent may be utilized, including, but not limited to, tetrahydrofuran, benzene, chloroform or the like. Poly-TPD(4B) has a long side chain of butyl ($C_4H_9$) that provides temperature-dependent dimerization, which may not be found with shorter chains of TPD polymers. The temperature-dependent dimerization property permits temperature control of the laser, since poly-TPD(4B) lases only at elevated temperature. The molar concentration of the poly-TPD(4B) in the solution is between approximately 5 µM and approximately 100 µM. Adjustment of the molar concentration of the poly-TPD(4B) in the solution provides for gross wavelength tuning of the output laser beam between approximately 415 nm and approximately 445 nm.

A pump laser generates an initial light beam. A lens disposed in a path of the initial light beam focuses the initial light beam into an excitation light beam. An optical cell contains the triphenylamine dimer-based conjugated polymer, and the optical cell is positioned so that the excitation light beam is directed towards the optical cell to cause the triphenylamine dimer-based conjugated polymer to lase. The optical cell has an inlet port and an outlet port. The triphenylamine dimer-based conjugated polymer at different concentrations is circulated through the inlet port and the outlet port of the optical cell by a pump or the like.

An optical cavity is spaced apart from the optical cell for intensifying stimulated radiation emitted from the triphenylamine dimer-based conjugated polymer. The optical cavity includes a fully reflective mirror and a partially reflective mirror, with the partially reflective mirror being configured for emitting the output light beam. The temperature of the triphenylamine dimer-based conjugated polymer is selectively and controllably adjusted to tune the power output of the output light beam.

Additionally, first and second tanks may be provided for releasably storing first and portions of the triphenylamine dimer-based conjugated polymer, respectively. The first and second portions each contain the triphenylamine dimer-based conjugated polymer laser medium in different concentrations. By selectively mixing the first and second portions of the triphenylamine dimer-based conjugated polymer, an overall concentration of the triphenylamine dimer-based conjugated polymer in the optical cell may be selectively controlled to tune the wavelength of the output light beam.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

The conjugated polymer laser with temperature-controlled power output 10 uses a triphenylamine dimer-based conjugated polymer as the laser medium to produce an output laser beam $B_O$ having a beam energy tunable between approximately 20 μJ and approximately 325 μJ over a temperature range of the triphenylamine dimer-based conjugated polymer between approximately 40° C. and approximately 85° C. The poly-TPD conjugated polymer laser medium is a solution of poly[N,N'-bis(4-butylphenyl)-N,N'-bisphenylbenzidine], known as poly-TPD(4B), dissolved in a solvent, such as toluene. However, it should be understood that any other suitable type of solvent may be utilized, including, but not limited to, tetrahydrofuran, benzene, chloroform or the like. Poly-TPD(4B) has a long side chain of butyl ($C_4H_9$), that provides temperature-dependent dimerization, which may not be found with shorter chains of TPD polymers, such as in poly-TPD(4E) or poly-TPD(4M). The temperature-dependent dimerization property permits temperature control of the laser, since poly-TPD(4B) lases only at elevated temperature. The molar concentration of the poly-TPD(4B) in the solution is between approximately 5 μM and approximately 100 μM. As will be described in greater detail below, adjustment of the molar concentration of the poly-TPD(4B) in the solution provides for gross wavelength tuning of the output laser beam $B_O$ between approximately 415 nm and approximately 445 nm.

Figure 1:
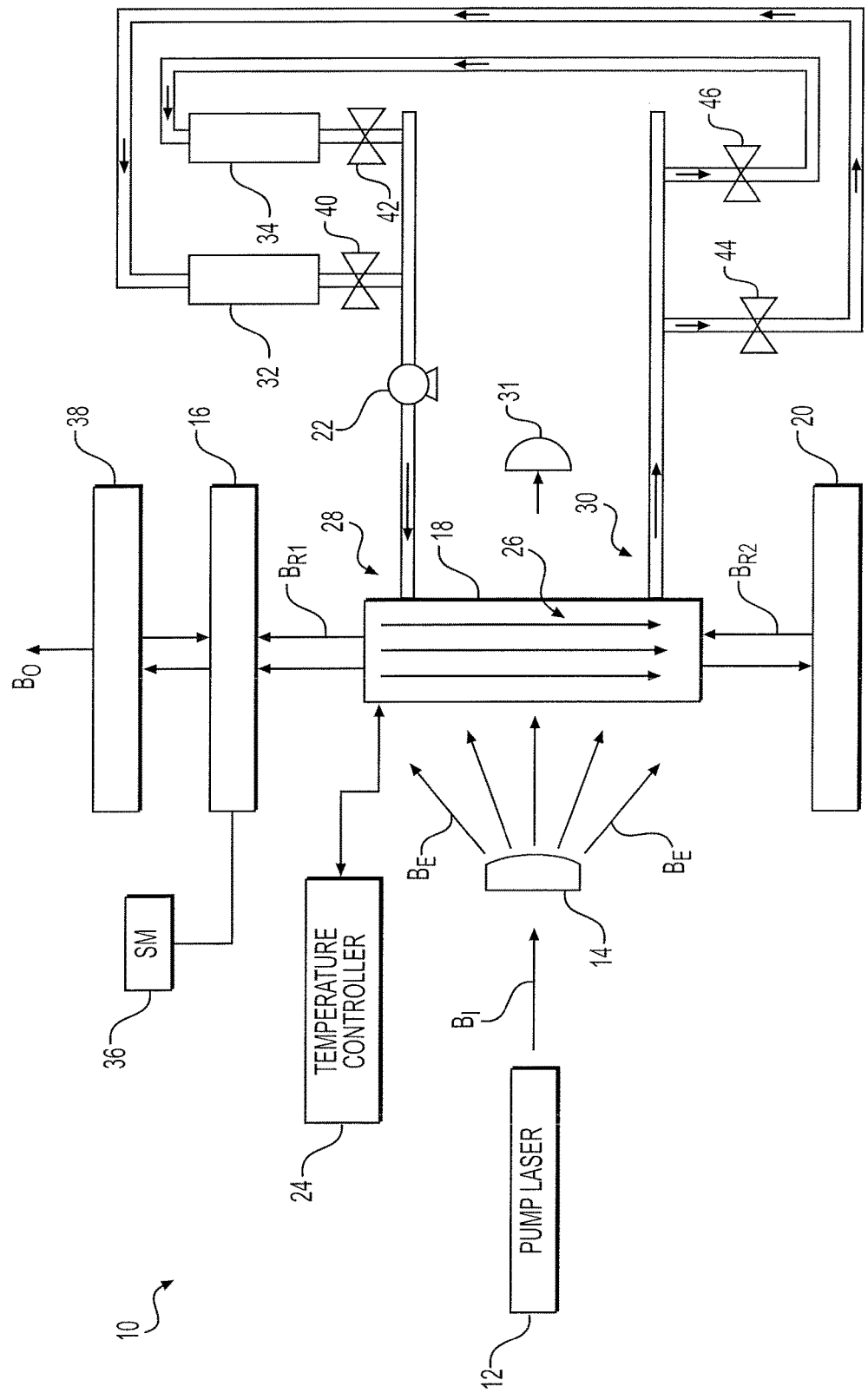
FIG. 1 is a schematic diagram of a conjugated polymer laser with temperature-controlled power output.

The triphenylamine dimer-based conjugated polymer laser medium may be used in combination with elements of a conventional laser system. As shown in FIG. 1, the conjugated polymer laser with temperature-controlled power output 10 includes a pump laser 12 for generating an initial light beam $B_I$. For the tunable energy output given above, the initial light beam may have a wavelength of approximately 355 nm. In the experiments detailed below, a Nd:YAG laser was used as the pump laser 12, producing an output beam having a wavelength of 355 nm delivered in 5 ns pulses at a pulse rate of 10 Hz. It should, however, be understood that any suitable initial laser source may be used. For example, a diode array with a pump wavelength of 400 nm may be used instead of pump laser 12.

As is common in lasers using a coherent light beam as an initial excitation source, the initial light beam $B_I$ is focused by a lens 14 into an excitation light beam $B_E$. It should be understood that the lens 14 is shown for exemplary purposes only, and that any suitable type of intermediate optics may be utilized. In the experiments detailed below, a quartz plano-convex lens having a focal length of 50 mm was used to focus the laser pulse $B_I$ to transversely excite the solution. Any unabsorbed portions of initial laser beam $B_I$ will pass through optical cell 18 to be damped by a beam stopper 31.

The triphenylamine dimer-based conjugated polymer laser medium is circulated through an optical cell 18, and the excitation light beam $B_E$ is directed towards the optical cell 18 to cause the triphenylamine dimer-based conjugated polymer to lase. It should be understood that any suitable type of optical cell may be utilized. In the experiments detailed below, a conventional quartz cuvette was used as the optical cell 18. As shown, the optical cell 18 has an inlet port 28 and an outlet port 30 for respectively injecting and removing the triphenylamine dimer-based conjugated polymer circulated through the optical cell 18 (indicated by arrows 26 in FIG. 1). Exemplary pump 22 is shown driving the triphenylamine dimer-based conjugated polymer to circulate through the optical cell 18, although it should be understood that any suitable type of pump, circulator or the like may be used.

A temperature controller 24 may be in direct contact with the optical cell 18 for selectively and adjustably controlling the temperature of the triphenylamine dimer-based conjugated polymer, or the temperature controller 24 may be external to the optical cell 18 for pre-heating or pre-cooling the triphenylamine dimer-based conjugated polymer prior to injection into the optical cell 18. It should be understood that any suitable type of temperature controller may be used, such as a conventional heater, cooler, chiller, fan, Peltier device, thermoelectric cooler, heat pump or the like.

An optical cavity is spaced apart from the optical cell 18 for intensifying stimulated radiation (shown in FIG. 1 as reflected light beams $B_{R1}$ and $B_{R2}$) emitted from the triphenylamine dimer-based conjugated polymer. As in a conventional laser system, the optical cavity is formed by a fully reflective mirror 20 and a partially reflective mirror 38 arranged opposite one another around the laser medium, so that the output light beam $B_O$ exits the partially-reflective mirror 38. For fine tuning the wavelength of the output light beam $B_O$, an adjustable optical grating 16 may be interposed between the optical cell 18 and the partially reflective mirror 38. For example, grating 16 may be a 1000 lines/inch grating mound on a stepper motor (SM) 36. In the experiments detailed below, the optical resonator cavity used a 100% reflective mirror and a mirror with a 60% reflectivity.

The selective and controllable adjustment of the temperature of the triphenylamine dimer-based conjugated polymer by the temperature controller 24 is used to selectively and controllably tune the energy of the output light beam $B_O$, thus controlling the overall power output of laser 10. The temperature controller 24 is used to heat the solution to dissociate the dimers of the poly-TPD(4B), thus converting the temperature-dependent poly-TPD(4B) into an optical gain material, allowing for activation of the laser action. At low temperatures, e.g., at or below 37° C., the poly-TPD (4B) conjugated polymer dimerizes, increasing the reabsorption and scattering process, and will not lase. As the temperature increases to about 40° C. and above, the dimerized polymer dissociates into individual polymer chains and unfolds, increasing the absorption co-efficiency, transparency, optical gain co-efficiency, and optical gain cross sections, activating the conjugated polymer to lase. After the laser is activated, when the temperature continues to rise, the output energy correspondingly increases.

Additionally, as shown in FIG. 1, tuning of the wavelength of the output light beam $B_O$ may be accomplished by adjusting the concentration of the triphenylamine dimer-based conjugated polymer laser medium. For example, as shown in the exemplary configuration of FIG. 1, two tanks 32, 34 may be provided, each containing a different concentration of poly-TPD(4B) dissolved in toluene. For example, the first tank 32 may contain the poly-TPD(4B) conjugated polymer laser medium with a molar concentration of 20 μM, and second tank 34 may contain the poly-TPD(4B) conjugated polymer laser medium with a molar concentration of 100 μM. The concentration of the conjugated polymer affects the wavelength tunability of the laser. The low concentration solution has good wavelength tunability in the range of 415 to 435 nm, and the high concentration solution is efficient for the range 435-445 nm. Valves 40, 42 are provided, respectively, for the input of the conjugated polymer laser medium from first and second tanks 32, 34, and through selective opening, closing and adjustment of valves 40, 42, the concentration of the conjugated polymer laser medium flowing through optical cell 18 may be controlled. This tuning of the concentration of the lasing medium provides for selective tuning of the wavelength of the output laser beam $B_O$ between approximately 415 nm and approximately 445 nm. The uptake of the conjugated polymer laser medium may be correspondingly controlled through selective opening, closing and adjustment of valves 44, 46 for return, respectively, to first tank 32 and second tank 34.

Figure 2:
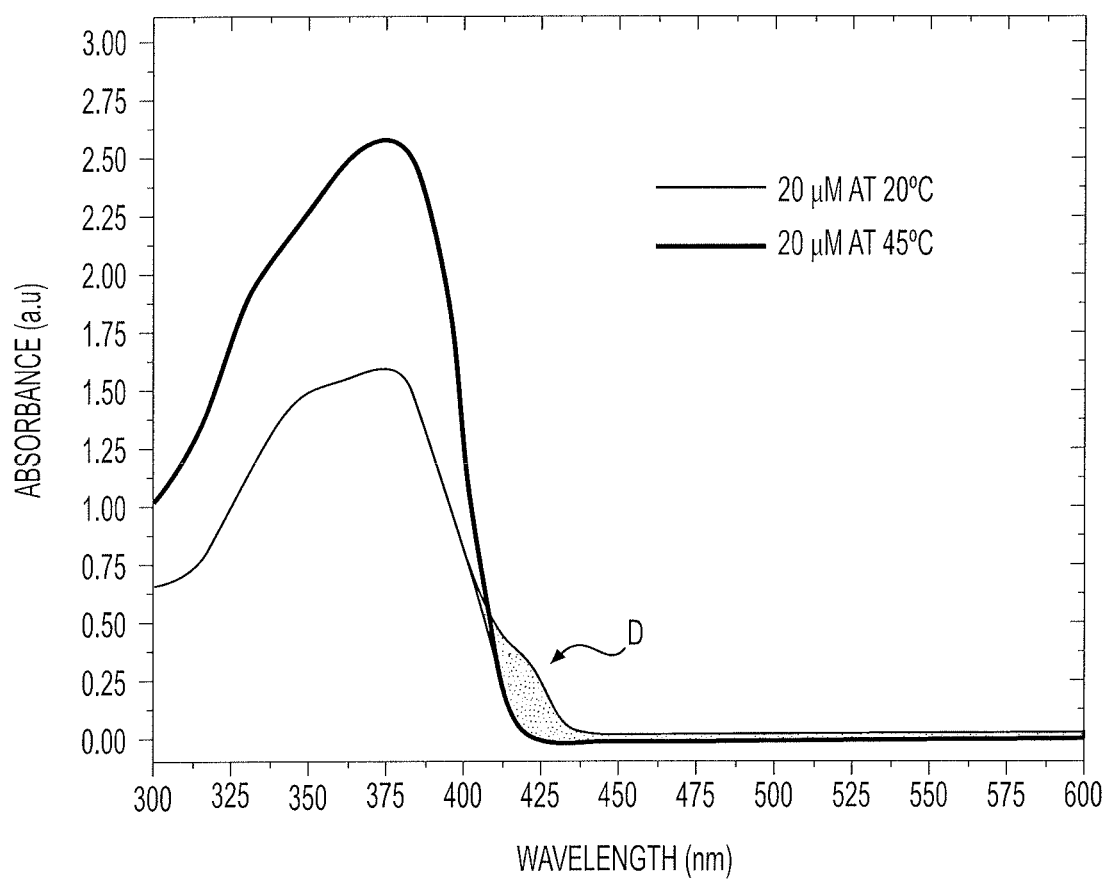
FIG. 2 is a comparison of the absorption spectra of solutions of poly[N,N'-bis(4-butylphenyl)-N,N'-bisphenylbenzidine] (poly-TPD(4B)) dissolved in toluene at a concentration of 20 μM at temperatures of 20° C. and 45° C.

With regard to the temperature dependence of the poly-TPD laser medium, FIG. 2 shows the absorption spectrum of poly-TPD(4B) solution with a molar concentration of 20 μM at both 20° C. and 45° C. In FIG. 2, "D" represents the region of dimerization at low temperature. FIG. 2 clearly shows the presence of a "hump", which is due to dimer formation at room temperature (20° C.) and the disappearance of dimers as the temperature of the liquid media is increased.

Figure 3:
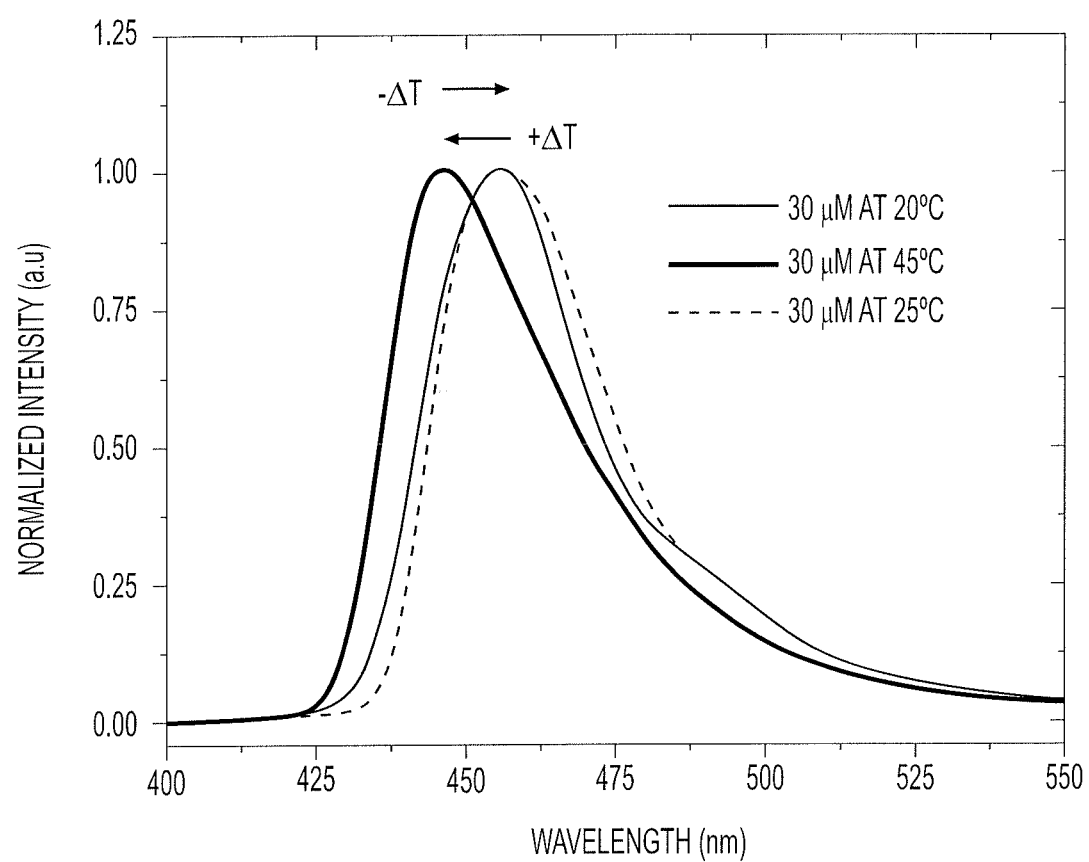
FIG. 3 is a comparison of the fluorescence spectra of a poly-TPD(4B) solution in toluene at 30 μM at temperatures of 20° C., then 45° C., and then 25° C., showing reversibility of the peak intensity wavelength.
Figure 4:
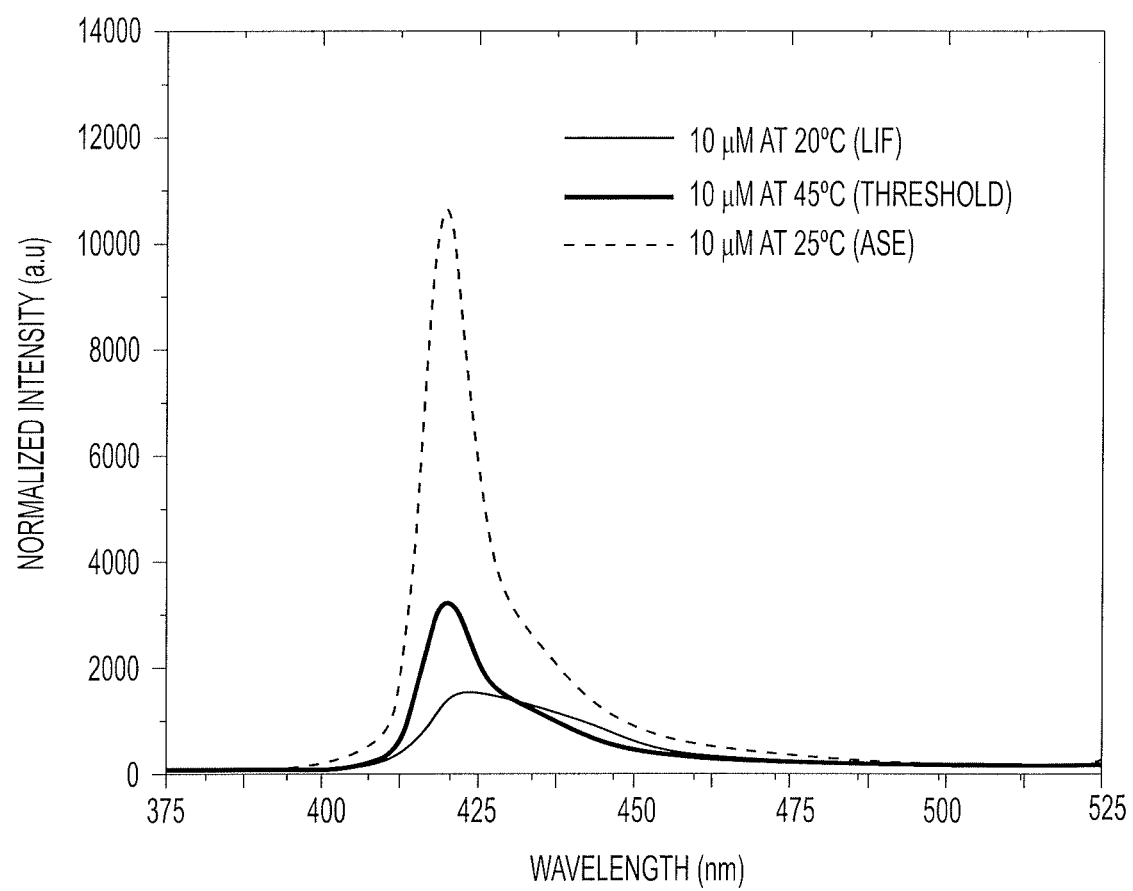
FIG. 4 is a comparison of the intensity of an output laser beam of the conjugated polymer laser with temperature-controlled power output induced by a pump laser at 13 mJ of a poly-TPD(4B) 10 μM solution at temperatures of 20° C. (laser-induced fluorescence, or LIF), 33° C. (Threshold, or Th), and 55° C. (amplified spontaneous emission, or ASE).

FIG. 3 shows the fluorescence spectrum of the poly-TPD (4B) solution at a concentration of 30 μM at temperatures of 20° C., 45° C. and 25° C. In FIG. 3, a reversible thermochromic shift is apparent. At a temperature of 20° C., a peak can be seen at 457 nm. When heated to 45° C., the peak is around 445 nm, and when the solution was cooled back to 25° C., the peak shifted to 455 nm. FIG. 4 shows the laser induced fluorescence (LIF) at 20° C., threshold at 33° C., and amplified spontaneous emission (ASE) at 55° C. for the poly-TPD(4B) solution laser medium, where the concentration of the poly-TPD(4B) in the solution was 10 μM, the pump laser energy was held at a constant 13 mJ, and the temperature was varied between 20° C. and 70° C. It can be clearly seen that the intensity of the output laser beam increased as the temperature of the poly-TPD(4B) solution increased.

Figure 5:
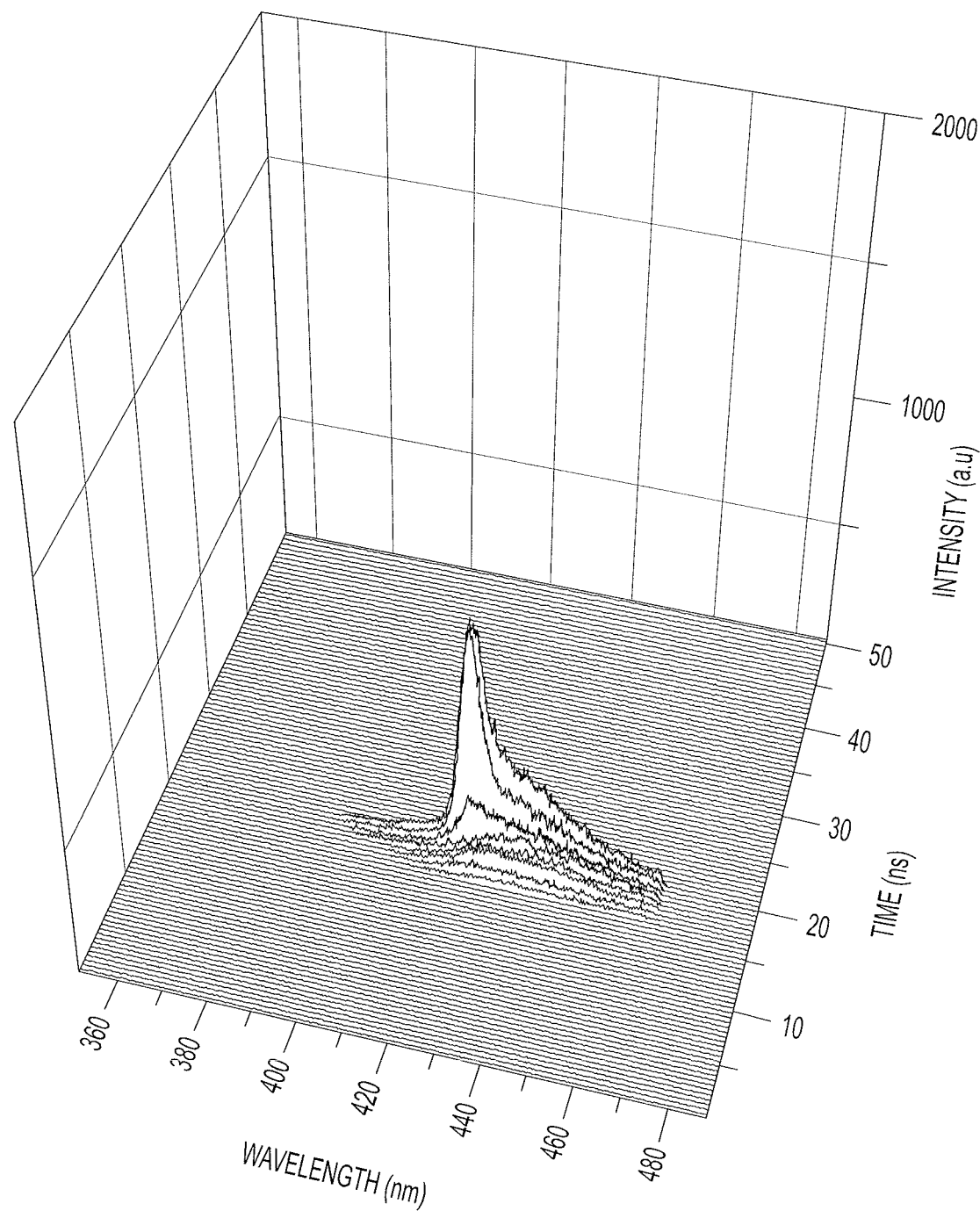
FIG. 5 is a 3-D plot of the amplified spontaneous emission (ASE) spectrum of the conjugated polymer laser with temperature-controlled power output with the temperature of the poly-TPD(4B) solution, used as a lasing medium, at 37° C. at a concentration of 20 μM.
Figure 6:
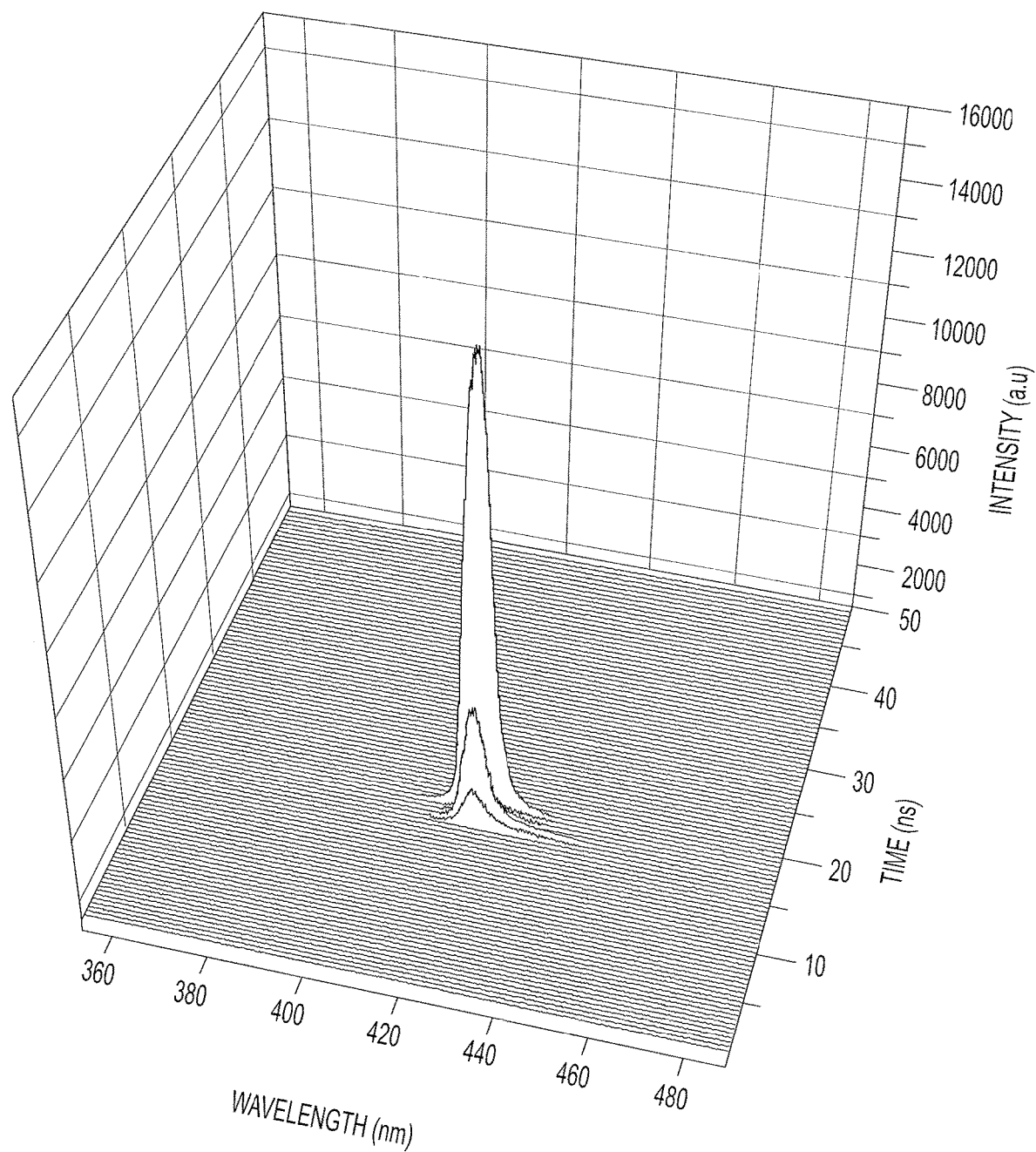
FIG. 6 is a 3-D plot of the amplified spontaneous emission (ASE) spectrum of the conjugated polymer laser with temperature-controlled power output with the temperature of the poly-TPD(4B) solution, used as a lasing medium, at 80° C. at a concentration of 20 μM.
Figure 7:
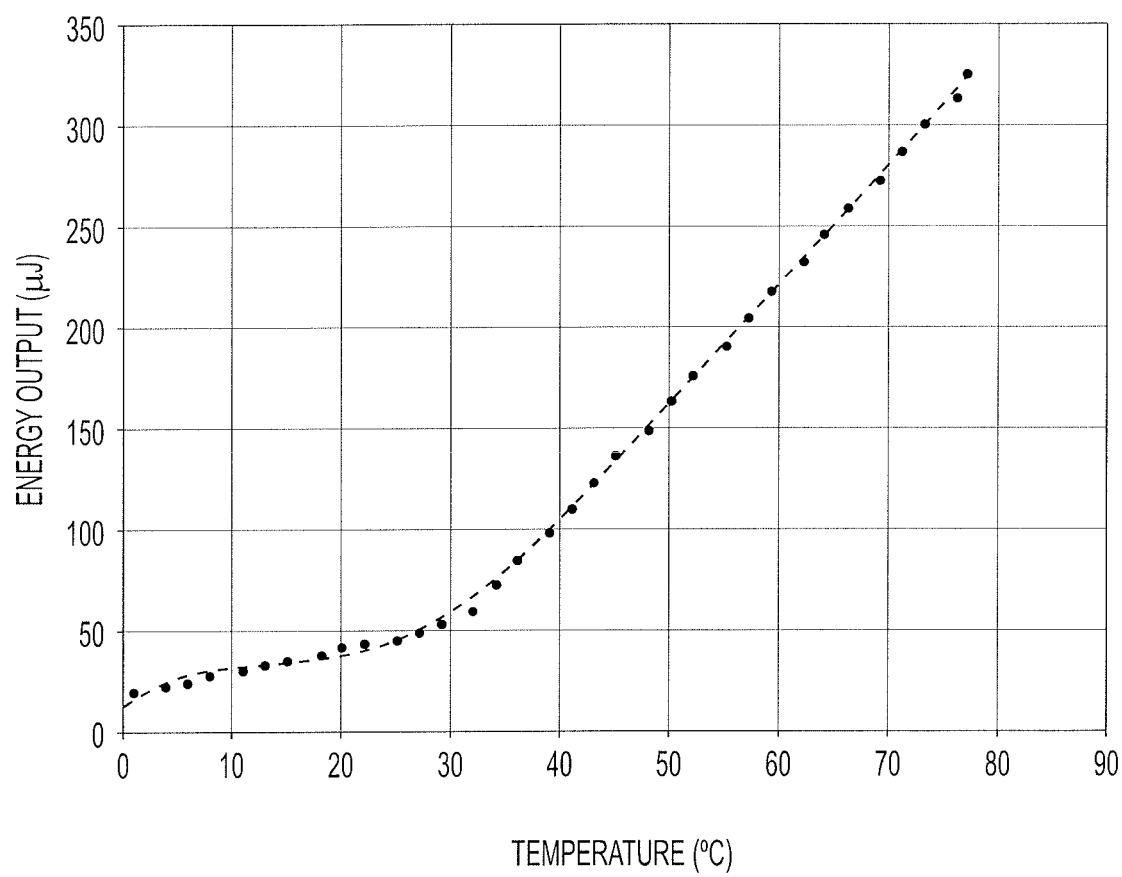
In FIG. 7 is a plot showing the energy of the output laser beam of the conjugated polymer laser with temperature-controlled power output as a function of temperature of the poly-TPD(4B) solution at a constant input energy of 10 mJ.

FIG. 5 shows the ASE spectrum of the poly-TPD(4B) solution with a molar concentration of the poly-TPD(4B) of 20 μM. For the results of FIG. 5, the pump laser energy was 10 mJ and the temperature of the poly-TPD(4B) solution was 37° C. In FIG. 5, the ASE is seen as just beginning to manifest. The energy of the output laser beam was 20 pJ. In FIG. 6, the temperature was increased to 80° C. and, once again, the ASE is just beginning to manifest. At 80° C., the energy of the output laser beam was 320 μJ. FIG. 7 is a plot clearly showing the energy output as being directly related to the temperature of the poly-TPD solution. In FIG. 7, the energy of the pump laser was 10 mJ.

It is to be understood that the conjugated polymer laser with temperature-controlled power output is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A conjugated polymer laser with temperature-controlled power output, comprising:
   a pump laser for generating an initial light beam defining a path;
   a lens disposed in the path of the initial light beam for focusing the initial light beam into an excitation light beam;
   a triphenylamine dimer-based conjugated polymer, the polymer being unable to lase at or below a deactivation temperature and being activated to lase above the deactivation temperature, the polymer exhibiting increasing laser power output with increasing temperature after activation;
   an optical cell containing the conjugated polymer, the optical cell being positioned so that the excitation light beam is directed towards the optical cell to cause the triphenylamine dimer-based conjugated polymer to lase above the deactivation temperature, wherein the optical cell further comprises an inlet port and an outlet port, the conjugated polymer laser further comprising:
   i) a first reservoir containing the conjugated polymer at a first concentration;
   ii) a second reservoir containing the conjugated polymer at a second concentration distinct from the first concentration;
   iii) a conduit system connecting the first and second reservoirs with the inlet and outlet ports of said optical cell;
   iv) a plurality of control valves disposed in the conduit system configured to selectively fill said optical cell the solution from the first or the second reservoir and to recirculate the solution back to the corresponding reservoir; and
   v) a pump disposed in the conduit system to pump the solutions to and from the corresponding reservoirs for gross wavelength tuning of the output light beam;

an optical cavity spaced apart from the optical cell for intensifying stimulated radiation emitted from the conjugated polymer, the optical cavity having a fully-reflective mirror and a partially-reflective mirror, the partially-reflective mirror being configured for emitting an output light beam; and a temperature controller disposed to selectively and controllably adjust the temperature of the conjugated polymer to activate and deactivate stimulated emission of radiation from the conjugated polymer, and to tune a power output of the output light beam.

2. The conjugated polymer laser with temperature-controlled power output as recited in claim 1, wherein the triphenylamine dimer-based conjugated polymer comprises a solution of poly[N,N'-bis(4-butylphenyl)-N,N'-bisphenylbenzidine] dissolved in a solvent.

3. The conjugated polymer laser with temperature-controlled power output as recited in claim 2, wherein the solvent is selected from the group consisting of toluene, tetrahydrofuran, benzene and chloroform.

4. The conjugated polymer laser with temperature-controlled power output as recited in claim 3, wherein the solution has a molar concentration of poly[N,N'-bis(4-butylphenyl)-N,N'-bisphenylbenzidine] between 5 μM and 100 μM.

5. The conjugated polymer laser according to claim 3, wherein tunability of the output light beam over a range of wavelengths is dependent upon the concentration of the conjugated polymer in the optical cell.

6. The conjugated polymer laser according to claim 3, wherein the output light beam is tunable at wavelengths between 415 nm and 435 nm when the concentration of the conjugated polymer in the optical cell is 20 μM and tunable at wavelengths between 435 nm and 445 nm when the concentration of the conjugated polymer in the optical cell is 100 μM.

7. The conjugated polymer laser according to claim 1, wherein:
said low concentration comprises 20 μM of the conjugated polymer in toluene, the output light beam being tunable between 415 nm and 435 nm; and
said high concentration comprises 100 μM of the conjugated polymer in toluene, the output light beam being tunable between 435 nm and 445 nm.

8. The conjugated polymer laser according to claim 1, further comprising an adjustable optical grating disposed between said optical cell and said partially reflective mirror for fine tuning the wavelength of the output light beam.

9. The conjugated polymer laser according to claim 1, wherein said temperature controller is external to said optical cell and configured for adjusting the temperature of the solution of the conjugated polymer prior to filling the optical cell with the solution of the conjugated polymer.

10. The conjugated polymer laser according to claim 1, wherein said temperature controller is in direct contact with said optical cell and configured for adjusting the temperature of the solution of the conjugated polymer after filling the optical cell with the solution of the conjugated polymer.

11. The conjugated polymer laser according to claim 3, wherein said deactivation temperature is 37° C., said conjugated polymer being unable to lase when the temperature of the solution of the conjugated polymer is 37° C. and below, said conjugated polymer being activated to lase when the temperature of the solution of the conjugated polymer is above 37° C.

12. The conjugated polymer laser according to claim 1, wherein said temperature controller is selected from the group consisting of a heater, a cooler, a chiller, a fan, a Peltier device, a thermoelectric cooler, and a heat pump.

13. A conjugated polymer laser, comprising:
a pump laser for generating an initial light beam defining a path;
a lens disposed in the path of the initial light beam for focusing the initial light beam into an excitation light beam;
a triphenylamine dimer-based conjugated polymer;
an optical cell containing a solution of the triphenylamine dimer-based conjugated polymer, the optical cell having an inlet port and an outlet port, the optical cell being positioned so that the excitation light beam is directed towards the optical cell to cause the triphenylamine dimer-based conjugated polymer to lase;
an optical cavity spaced apart from the optical cell for intensifying stimulated radiation emitted from the triphenylamine dimer-based conjugated polymer, the optical cavity having a fully-reflective mirror and a partially-reflective mirror, the partially-reflective mirror being configured for emitting an output light beam, tunability of the output light beam over a range of wavelengths being dependent upon concentration of the solution of the conjugated polymer in the optical cell;
a first reservoir containing the solution of the conjugated polymer at low concentration;
a second reservoir containing the solution of the conjugated polymer at high concentration;
a conduit system connecting the first and second reservoirs with the inlet and outlet ports of said optical cell;
a plurality of control valves disposed in the conduit system configured to selectively fill said optical cell the solution from the first or the second reservoir and to recirculate the solution back to the corresponding reservoir; and
a pump disposed in the conduit system to pump the solutions to and from the corresponding reservoirs for gross wavelength tuning of the output light beam.

14. The conjugated polymer laser with temperature-controlled power output as recited in claim 13, wherein the triphenylamine dimer-based conjugated polymer comprises a solution of poly[N,N'-bis(4-butylphenyl)-N,N'-bisphenylbenzidine] dissolved in a solvent.

15. The conjugated polymer laser with temperature-controlled power output as recited in claim 14, wherein the solvent is selected from the group consisting of toluene, tetrahydrofuran, benzene and chloroform.

16. The conjugated polymer laser as recited in claim 15, wherein:
said low concentration comprises 20 μM of the conjugated polymer in toluene, the output light beam being tunable between 415 nm and 435 nm; and
said high concentration comprises 100 μM of the conjugated polymer in toluene, the output light beam being tunable between 435 nm and 445 nm.

17. The conjugated polymer laser according to claim 15, further comprising an adjustable optical grating disposed between said optical cell and said partially reflective mirror for fine tuning the wavelength of the output light beam.

18. The conjugated polymer laser as recited in claim 15, further comprising a temperature controller positioned to control temperature of the solution of the conjugated polymer, the conjugated polymer being unable to lase when the temperature of the solution of the conjugated polymer is 37°

C. and below, the conjugated polymer being activated to lase when the temperature of the solution of the conjugated polymer is above 37° C.

19. The conjugated polymer laser as recited in claim 15, wherein power output of the output light beam increases with increasing temperature after the conjugated polymer is activated to lase.

\* \* \* \* \*